UNITED STATES PATENT OFFICE.

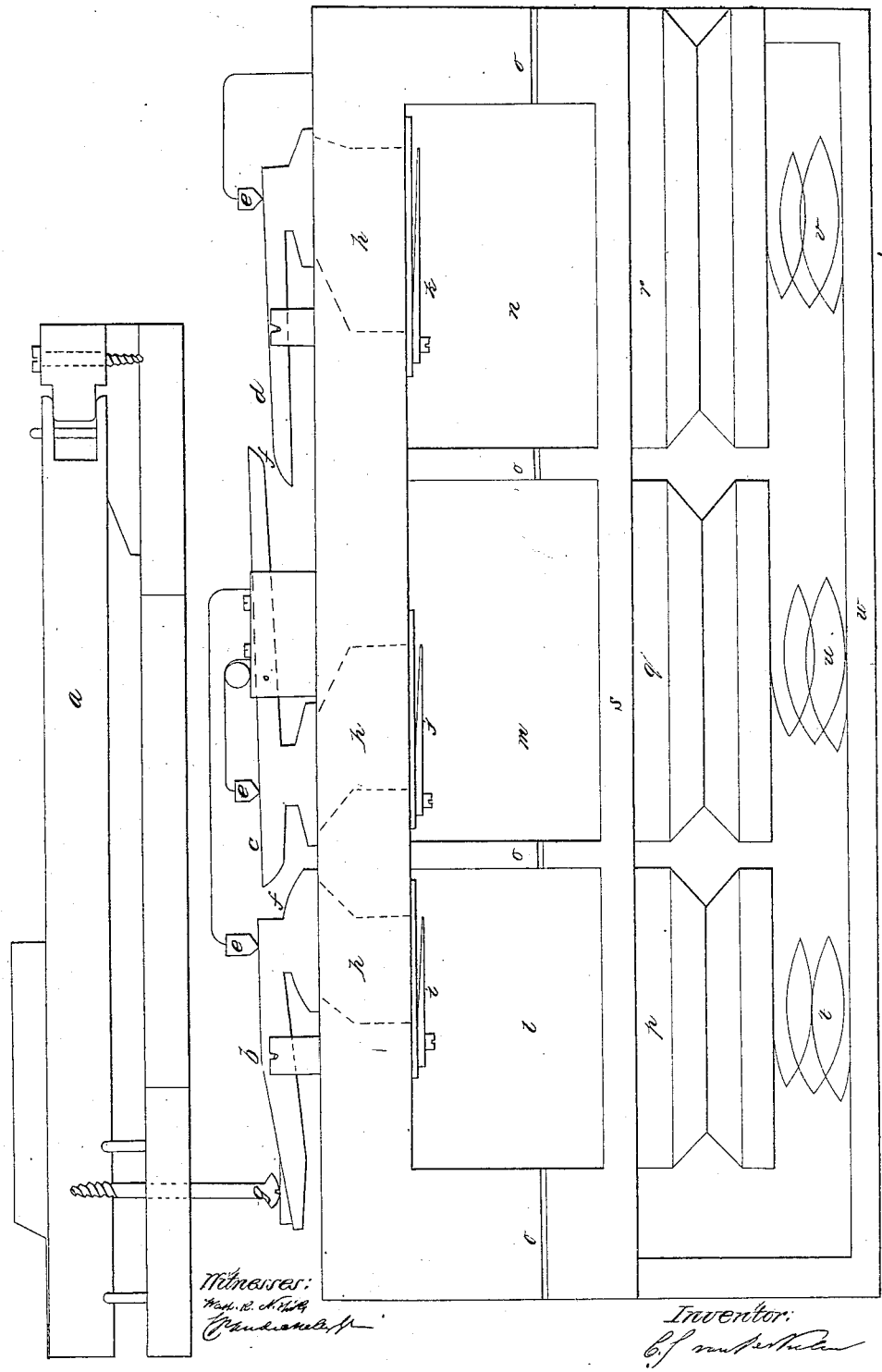

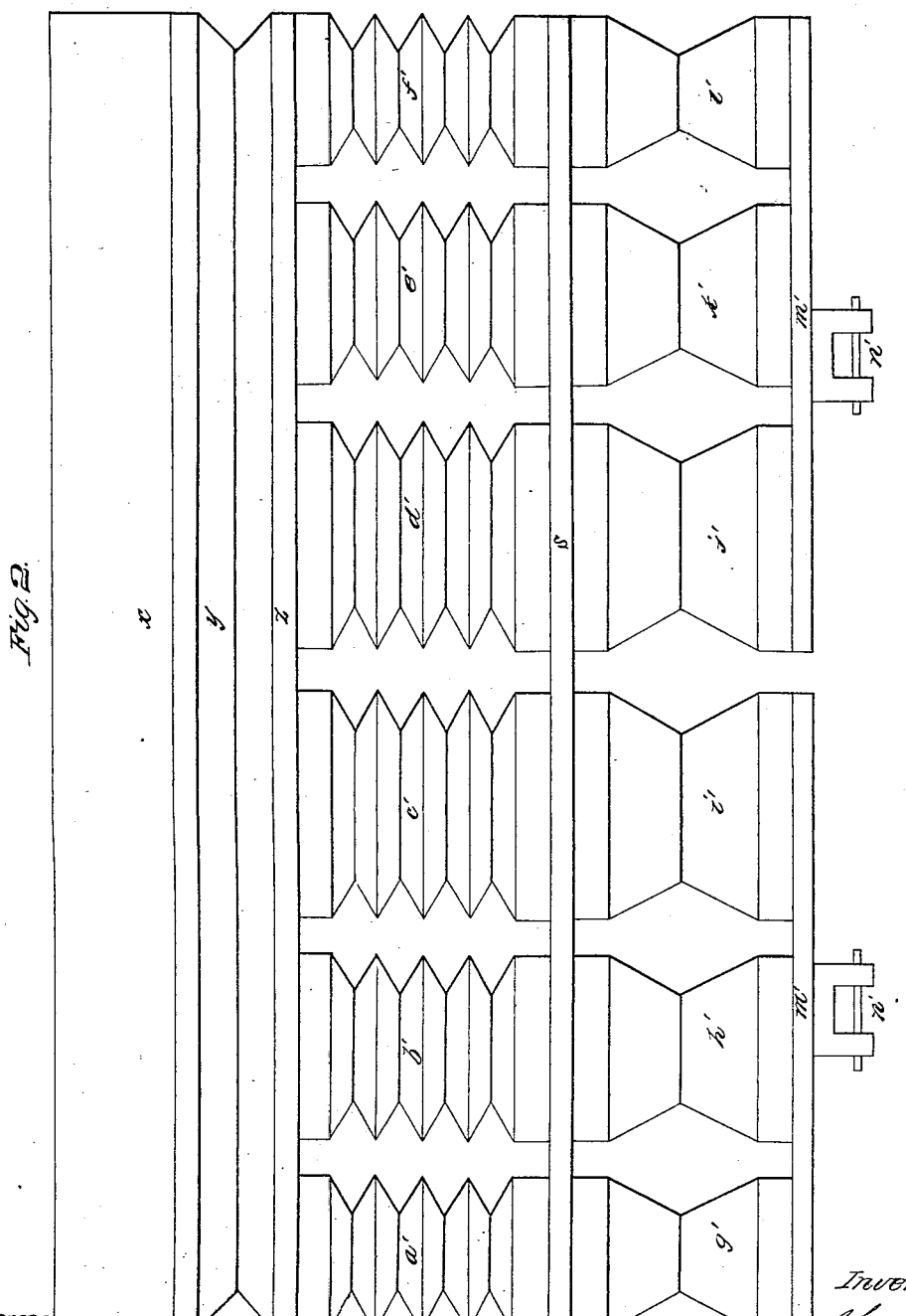

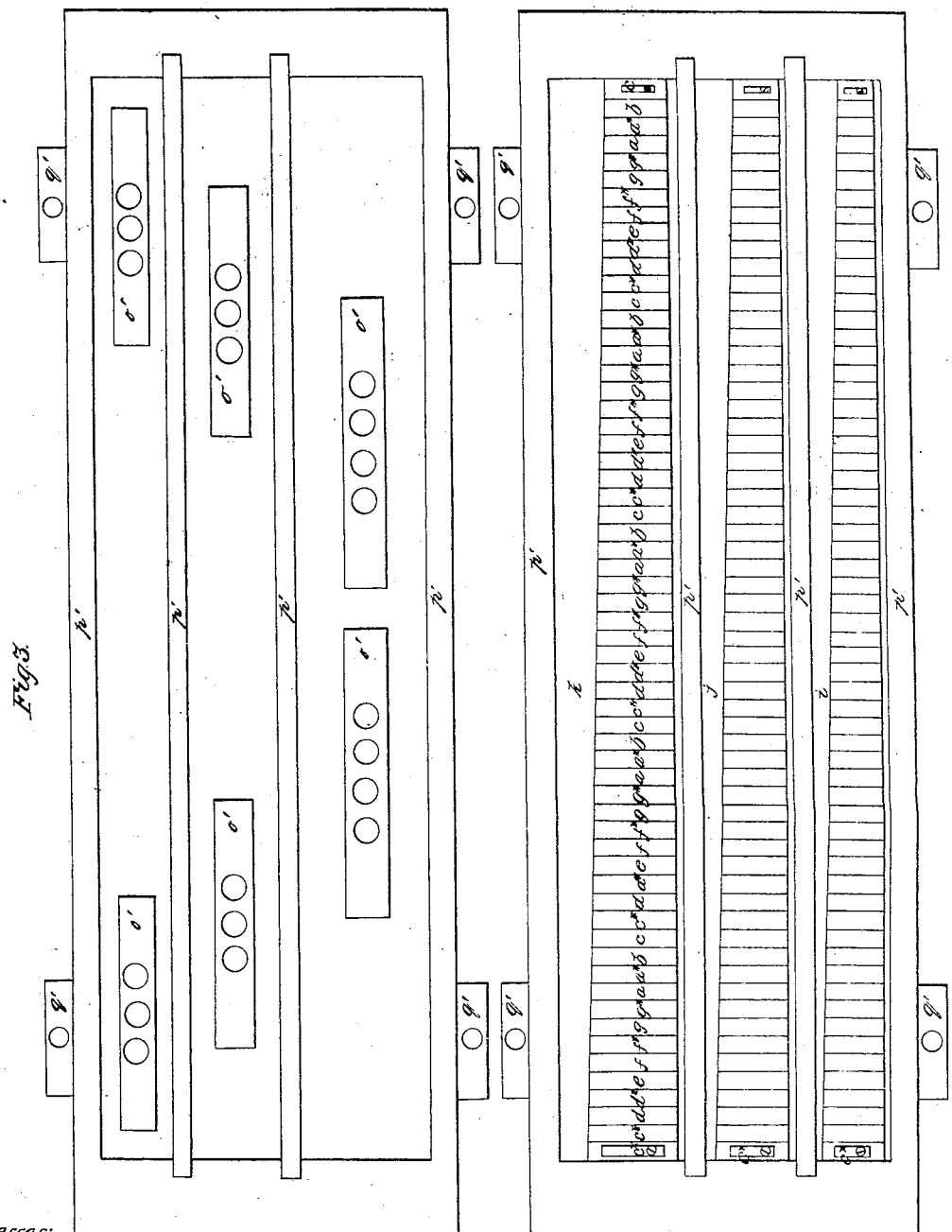

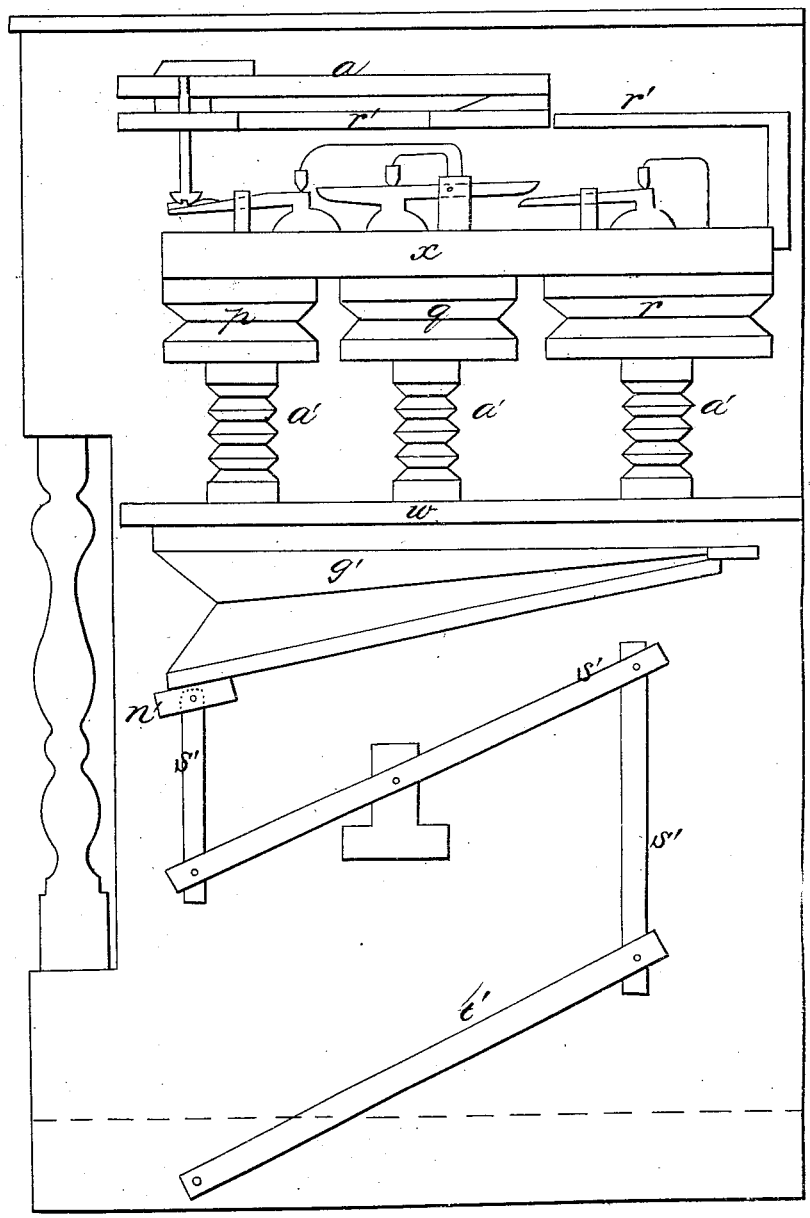

CORNELIUS J. VAN OECKELEN, OF NEW YORK, N. Y.

WIND MUSICAL INSTRUMENT.

Specification of Letters Patent No. 22,139, dated November 23, 1858.

*To all whom it may concern:*

Be it known that I, CORNELIUS J. VAN OECKELEN, of the city, county, and State of New York, have invented a new Musical Instrument; and I do hereby declare that the following is a full and exact description thereof, reference being had to the accompanying drawings and to the letters of reference marked thereon.

I call my instrument a "triolodeon." It is in the form of the ordinary melodeon and has the capacity of increasing and diminishing each note independently of all the others. The agent for the production of the sounds is the reed as in the common melodeon.

To enable others skilled in the art to make and use my invention I describe the same as follows:

It consists of the following parts: 1, the exterior case; 2, the keyboard; 3, the mechanism connected with the keyboard; 4, the case of reeds; 5, the air reservoirs; 6, the air conductors; 7, the bellows; 8, the sounding boards.

1. *The exterior case.*

The exterior of the instrument is in form of the ordinary melodeon. In front is the keyboard and below it the opening to work the bellows. The instrument is of the ordinary form and size.

2. *The keyboard.*

The keyboard may have a range of seven octaves or more but the keyboard in ordinary use for melodeons has a range of only 5 or 5½ octaves. Under each key of the keyboard is fixed a screw as in Plate 1, *g*, the lower end of which is connected with the mechanism and which serves at the same time to regulate the keys.

3. *The mechanism connected with the keyboard.*

The mechanism connected with the keyboard consists of three rows of valves as in Plate 1, *b, c, d*. Each of these rows contains as many valves as there are keys in the keyboard.

Under each valve is an aperture from which the air escapes when not prevented by the closing of the valve (Plate 1, *h*). Each valve is fitted with a spring to keep it closed communicating its pressure by a movable point (Pl. 1, *e*) in order to avoid friction.

The first and third rows of valves most closely resemble each other but the second are different in form as in Plate 1, *b, c, d*. Those of the first and second rows serve at the same time as levers to open the next connecting valves respectively and to act upon the apertures to which they are respectively fitted (see Plate 1, *f*.) Thus the crescendos and diminuendos are executed by the pressure of the fingers upon the keys. By touching very lightly, the first valve only is opened, which then permits the air to pass from the aperture beneath it and causes only the reed to vibrate which is placed under this valve, which reed yields a tone quite soft. By pressing a little stronger upon the key, the second valve is also opened by the first and then the sound of the vibration of the second reed is heard together with that of the first. Finally by pressing the key fully down the second valve opens also the third and then the sound of the vibration of the three reeds altogether is heard. The diminuendo is executed in inverse order that is by lightly releasing the pressure of the fingers from the keys. Thus each key has so to speak its peculiar pedal so that the performer can shade each note at will each independent of the other. By these means vibrations can be produced such as are heard some times upon the violin by causing the fingers to vibrate upon the keys of the keyboard (Plate 1, *a*).

The varying volume of sound is regulated not only by bringing in to play one or several reeds but still further by varying currents of air as hereinafter described.

4. *The case of reeds.*

The case of reeds is a box containing the reeds as in Plate 1, *i, j, k*, and is divided horizontally into two parts of which the upper is pierced in its upperside with as many holes as there are valves by which holes the sound produced by the reeds passes. These reeds are placed in the interior of the upper box while the valves are over the holes to prevent the air from escaping until they are opened (Plate 1, *b, c, d*.)

The case of reeds is further divided internally into three compartments as in Plate 1, *l, m, n*, in which respectively are placed the three rows of reeds proportioned according to their volume of sound. Thus the row of smallest ones is in the smallest compartment.

The next in size in the next larger compartment and the third in the largest compartment.

It is to be understood that each key in the keyboard acts on 3 reeds of different power but that each of these reeds has the same musical value so that the $c^x$ (Plate 3 compartment $i$) produces the proper sound of the note but soft. The $c^x$ in compartment $j$ same plate the same note but louder, and the $c^x$ in the compartment $k$ in the same plate, the same note the loudest of all, and so in like manner as to each key in the keyboard.

The lower part of the case contains only six valves of leather (Plate 3, $o'$) and compartments corresponding with those of the upper part of the case; the two parts being joined together (Plate 3, $q'$) so that the air can neither escape out of the case nor pass from the one compartment into the other. The two valves of leather in each compartment serve to allow the passage of the air which comes from the bellows and then close. The two parts of the case of reeds are united together by screws.

5. *The air reservoirs.*

To the lower part of the case of reeds are attached three reservoirs (Pl. 1, $p, q, r$) one for each compartment under which springs are placed varying in force for each reservoir (Pl. 1, $t, u, v$) to afford pressure of air. Their relative force is 10, 15 and 25 degrees according to the classification of manufacturers of organs. The pressure being 10 degrees in the first compartment, in the second it will be 15 degrees and in the third 25 degrees as soon as the air enters. When the air enters and the pressure of the air begins, the reservoirs enlarge downward, until the safety valves which are under them touch the bottom open, and allow the air which has become superabundant to escape.

6. *The air conductors.*

The air enters from the bellows into the case of reeds by elastic conductors (Pl. 2, $a'\ b'\ c',\ d'\ e'\ f'$) which are connected above with the apertures in the bottom of the reservoirs (Pl. 2, $z$) and below with apertures in the partition between the bellows and conductors (Pl. 2, $s$). The conductors are elastic so that if the reservoirs descend by reason of the pressure of the air they may bend to leave the passage free to the reservoirs.

7. *The bellows.*

The air is furnished by six bellows (Pl. 2 $g'\ h'\ i',\ j'\ k'\ l'$) combined three and three, (Pl. 2, $m'$) so that three bellows make one division: each bellows in each divison being proportioned in size and power and adapted to one of the three rows of reeds. Thus there are two divisons, each composed of three bellows, of which one is for the left foot and the other for the right, which operate alternately the bellows.

8. *The sounding boards.*

In order to mellow the tone of the reeds very thin slabs of wood are placed under the keyboard and directly above the reeds as also over the third row of valves (Pl. 4, $r'$). To vary the tone of the reeds, holes may be pierced in these slabs according to circumstances.

*General effect.*

When the pedals are alternately pressed by the feet, they by means of the levers (Pl. 4, $s'$) cause the bellows to work (Pl. 4, $g'$). The bellows press the air through the conductors (Pl. 4, $a'$) into the reservoirs (Pl. 4, $p, q, r$) and thence into the case of reeds where it remains confined by the springs (Pl. 1, $t, u, v,$) under the reservoirs. Then and by touching the keys the sounds may be produced as already mentioned.

The number of rows of reeds and of valves and the number and combinations of bellows may be varied to suit the constructor within moderate limits; having due regard to the proper combination of sizes and proportions.

What I claim as my invention and desire to secure by Letters Patent is—

1. The application to a musical instrument of several different rows of reeds, combined in such manner that each key of the instrument can produce several different sounds by causing one or several reeds to vibrate according to the pleasure of the performer, preserving always nevertheless the proper musical expression of the note in the manner substantially above described.

2. The arrangement of the several parts in such an instrument by which the power is obtained of causing each note to vibrate on itself and independently of all the others in the manner substantially above described.

3. The application to a musical instrument; the sounds of which are produced by the vibration of reeds of several rows of valves, so arranged as to act one upon the other and that the valves of the different rows thus connected can be opened either altogether or only one or more at a time by touching the same key of the instrument at the pleasure of the performer preserving always nevertheless the proper musical expression of the note in the manner substantially above described.

C. J. VAN OECKELEN.

Witnesses:
 WASH. R. NICHOLS,
 C. J. VAN OECKELEN, Jr.